Feb. 23, 1932.  R. C. FRYER  1,846,802
ELECTROMAGNETIC INSTRUMENT
Filed Aug. 11, 1924

INVENTOR:
Roy C. Fryer
BY Allen T Allen
ATTORNEYS.

Patented Feb. 23, 1932

1,846,802

UNITED STATES PATENT OFFICE

ROY C. FRYER, OF BELLEVUE, KENTUCKY, ASSIGNOR, BY DIRECT AND MESNE ASSIGNMENTS, TO METROPOLITAN DEVICE CORPORATION, A CORPORATION OF NEW YORK

ELECTROMAGNETIC INSTRUMENT

Application filed August 11, 1924. Serial No. 731,347.

My invention relates to new, improved, and useful methods of controlling the movement, characteristic with respect to time, of a magnetic body when actuated by magnetic fields, issuing from permanent or electromagnets. I specifically refer to such devices or apparatus in which is required or desired the movement of some element in accordance with a desired time factor; which movement is achieved by means of magnetic or electromagnetic action upon an element of magnetic material, rather than the movement obtained on account of electro-magnetic induction, or that due to a rotating magnetic field or to the equivalent thereof.

So far as I am advised there have been no simple and inexpensive devices provided, in the art, by means of which to control the time factor of operation of various devices, some of which are hereafter set forth. Therefore, it is my object to provide for time factor, and to control the characteristics of motion, under constant or varying velocity, of a magnetic element operating in a magnetic field, which element may be applied to devices, instruments, or apparatus to operate auxiliary mechanical, electrical, or electro-mechanical devices in accordance with certain time requirements; or same element may be made to be an integral part of such devices, instruments, or apparatus which will permit it to function or operate by virtue of its capacity to do work in accordance with required or desired time characteristics. It is my object thus to control the mechanical nature of the movable magnetic element rather than to electrically control the device, as has been done in the past to provide a time factor.

In its simplest form, my invention consists of a movable element in part or in whole of magnetic material, so formed and suspended in the vicinity of permanent or electromagnets that when the magnetic field intensity reaches a certain predetermined value which is sufficient to start the movable element from rest, said movable element will move in the magnetic field relatively to said field. The movable element, however, is so shaped, of such mass, and so pivoted with respect to the magnetic force that its motion begins in such direction as to alter the magnetic reluctance of the magnetic circuit and during its motion a rate of change of magnetic reluctance takes place in accordance with the shape, mass, and suspension of the said movable element.

Since the element moves with a constant or varying force, the time characteristics desired are obtained by shape of the moving element, point of suspension of the moving element, and the distribution of mass in the moving element. Furthermore, the movement can be given a definite time characteristic within magnetic fields which would not have sufficient strength to move the movable element were the path of movement rectilinear with relation to the mass of the movable element.

I accomplish the object set forth by that certain construction and arrangement of parts to be hereinafter more specifically pointed out and claimed.

Figure 1:
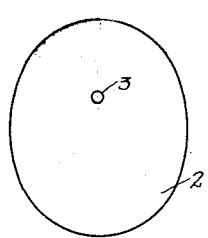
Figure 1 is a diagram of an electro-magnet and movable member illustrating my invention.

In Figure 1 I have shown an electro-magnet 1, an armature 2, of magnetic material and shaped as shown, mounted on pivot 3. When the electro-magnet is excited it will exert on the armature a pull which is a function of the magnetic field intensity causing the armature to move at a predetermined value of the exciting current. As the armature begins to move into the magnetic field relatively to the electro-magnet, a change in magnetic reluctance will take place, thus producing a variation in the velocity of the motion of the armature during its time of travel between predetermined points. Since the time of travel is a function of the velocity with which the armature moves, the time characteristic is predetermined by the shape of the armature, its point of suspension, and distribution of its mass, which are purely mechanical features.

Figure 2:
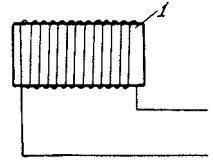
Figure 2 is a like view illustrating another form thereof in plan view.

In Figure 2 is shown an electro-magnet 4 and a movable member 5 of magnetic material shaped as a cam and mounted on a shaft 6 provided with a counteracting spring 7 which holds the armature in a predetermined position. Contact point 8 mounted on the armature engages with contact point 9 at a predetermined position of the armature, thus completing an electrical circuit through the contacts, armature, shaft and spring. The time required for the completion of this electrical circuit for any given positions of the contacts and any given field value is a function of the shape of armature, its distribution of mass, and its mounting. The use of the spring for bringing the moving element to normal-out-of-contact position may be dispensed with, and gravity may be relied upon.

My invention applies directly to use in circuit breakers, or other control and protective apparatus where a certain time factor is required for operation; thus, as an instance, I have described it in use with a circuit breaker. There are a multitude of uses for my device and I wish to be understood as describing this one use as an illustration of one out of many applications of my invention.

Figure 3:
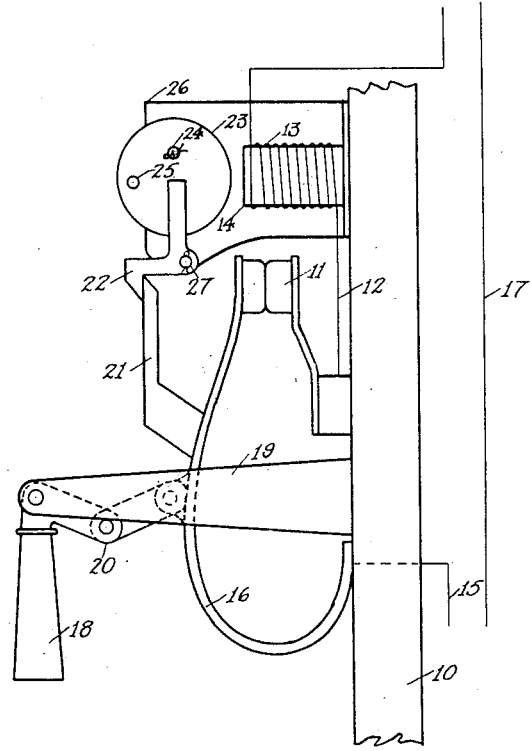
Figure 3 is a side elevation showing a circuit breaker in which a device of my invention is employed.

In Figure 3 is shown a panel 10 on which is mounted a contact 11 from which lead 12 passes to a coil 13 wound about core of magnetic material 14 and thence to the load. The incoming lead 15 is secured to a conductive spring metal contact element 16, and the other lead 17 passes directly to the load. A handle 18 is pivoted in bracket arms 19 and is connected by a toggle 20 with the spring element 16. On the contact element 16 is a finger 21, which engages when the contact is closed, behind a latch 22 pivoted at 27. By throwing the latch up and releasing the finger, the spring contacts will break contact and open the circuit quickly.

The armature or movable element of this device, which releases the latch 22 and thus brings about a breaking of the circuit, is illustrated at 23. It is a movable element rotatably mounted by an eccentric pivot pin 24 adjacent to the magnet 13, 14, and has a pin 25 thereon, which, when the armature rotates relatively to the magnet, will strike the latch 22 releasing finger 21 allowing circuit breaker to operate.

My invention resides in the nature of the movable element by means of which, on account of its curvature, distribution of mass and point of suspension, I control the time factor and action in general of the breaker device.

It is thus evident from the above considerations, that for any given magnetic field intensity or distribution of magnetic flux the element of my invention may be so shaped, so proportioned in mass, and so pivoted with respect to the magnetic field as to produce relative motion between the element and the magnetic field; said element being capable of doing work in accordance with certain time characteristics; hence I have therein provided a simple and inexpensive element which may be composed in whole or in part of magnetic material, said element associated with, or acted upon, or coupled with a magnetic field emanating from a permanent or electro-magnet; said element so shaped, proportioned and supported, as to introduce variation of magnetic reluctance and length of effective path of movement, for the purpose of producing relative motion between said element and said magnetic field, said motion thereby being in accordance with desired or required time characteristics. The following are some of the devices in which my invention may be incorporated and profitably employed:

1. Direct trip inverse time circuit breakers for meter service protection, branch service protection, motor starting, and intermittent overloads on motors, etc.

2. Inverse time relays for direct and alternating current circuits.

3. Automatic control for electrical equipment.

4. Sequence operating devices.

It is to be understood that the forms of my invention herewith shown and described are to be taken as examples of the same and that various changes in the shape, size, arrangement of parts and purpose of employment may be resorted to without departing from the spirit of my invention or the scope of the subjoined claims.

Having thus described my invention, what I claim as new and desire to secure by Letters Patent, is:—

1. A circuit controlling mechanism including in combination contacts in the circuit and an electromagnetic time lag device for operating said contacts, said device comprising an electromagnet and an armature of magnetic material in the field of said magnet, said armature being eccentrically suspended on a horizontal axis in a starting position of stable equilibrium, said contacts adapted to be operated by a movement of said armature through a determined distance from its starting position, the time lag through said determined distance being accurately controlled by the shape, point of suspension and the distribution of the mass of said armature (that is, without pneumatic, magnetic or other regulating means).

2. A circuit controlling mechanism including in combination contacts in the circuit and an electromagnetic time lag device for operating said contacts, said device comprising an electromagnet and an armature of magnetic material in the field of said magnet, said armature being eccentrically suspended on a horizontal axis in a starting position of stable equilibrium, said contacts adapted to be operated by a movement of said armature through a determined distance from its starting position, the time lag through said determined distance being accurately controlled by the shape, point of suspension and the distribution of the mass of said armature (that is, without pneumatic, magnetic or other regulating means) and the distribution of said mass being such that the armature can be continued in motion only by a continuance of at least the minimum current required to start it.

3. A circuit controlling mechanism including an electromagnetic time lag device for changing the condition of the circuit, said device comprising an electromagnet and an armature of magnetic material in the field of said magnet, said mechanism being operated by a movement of said armature through a determined distance from its starting position, the time lag through said determined distance being accurately controlled by the shape, point of suspension and the distribution of the mass of said armature (that is, without pneumatic, magnetic or other regulating means).

4. A circuit controlling mechanism including an electromagnetic time lag device for changing the condition of the circuit, said device comprising an electromagnet and an armature of magnetic material in the field of said magnet, said mechanism being operated by a movement of said armature through a determined distance from its starting position, the time lag through said determined distance being accurately controlled by the shape, point of suspension and the distribution of the mass of said armature alone (that is, without pneumatic, magnetic or other regulating means) and the distribution of said mass being such that the armature can be continued in motion only by a continuance of at least the minimum current required to start it.

ROY C. FRYER.